United States Patent [19]

King

[11] Patent Number: 4,494,127
[45] Date of Patent: Jan. 15, 1985

[54] APPARATUS AND METHOD FOR RECORDING BOTH MACHINE-READABLE AND PRINTED INFORMATION

[75] Inventor: Olin B. King, Huntsville, Ala.

[73] Assignee: SCI Systems, Inc., Huntsville, Ala.

[21] Appl. No.: 574,950

[22] Filed: Jan. 30, 1984

Related U.S. Application Data

[63] Continuation of Ser. No. 417,507, Sep. 13, 1982, abandoned, and Ser. No. 189,966, Sep. 23, 1980, abandoned.

[51] Int. Cl.³ ............................................. G07C 1/14
[52] U.S. Cl. ................................ 346/82; 235/377; 235/432; 360/2; 400/105; 400/580; 346/134
[58] Field of Search ............................. 346/82–86, 346/134, 1.1; 235/377, 419, 432; 360/2, 1; 400/582, 580, 105

[56] References Cited

U.S. PATENT DOCUMENTS

| | | | |
|---|---|---|---|
| 2,838,993 | 6/1958 | Hinrichs | 346/96 X |
| 3,146,342 | 8/1964 | Perotto | 360/24 X |
| 3,356,021 | 12/1967 | May | 360/1 X |
| 3,465,866 | 9/1969 | Gehring | 235/432 X |
| 3,553,649 | 1/1971 | Madge | 235/432 |
| 3,596,286 | 7/1971 | Coliz | 346/86 |
| 4,011,434 | 3/1977 | Hockler | 235/377 X |
| 4,017,857 | 4/1977 | Evans | 346/82 X |
| 4,041,503 | 8/1977 | Michez | 346/83 |
| 4,262,312 | 4/1981 | Fukuda | 360/2 |
| 4,270,043 | 5/1981 | Baxter | 235/419 |

*Primary Examiner*—Joseph W. Hartary
*Attorney, Agent, or Firm*—Gregor N. Neff

[57] ABSTRACT

A device for recording both machine readable information and visible information on a recording member such as a time-card or ledger card or pass-book with a strip of magnetic record material on it. The device includes recording apparatus for recording machine readable information on the recording member, a transport mechanism for moving the recording member and the recording apparatus relative to each other, a printer for printing visible characters or other marks upon the recording member, and print spacing apparatus which uses the relative motion between the recording member and the recording apparatus to space the characters from one another on the recording member. In a preferred embodiment, the recording apparatus is a magnetic recorder and the magnetic recorder and the printer are fixed relative to each other during the motion created by the transport mechanism. Preferably, the same mechanism which creates the relative motion for recording also moves the record card into and out of the device.

20 Claims, 8 Drawing Figures

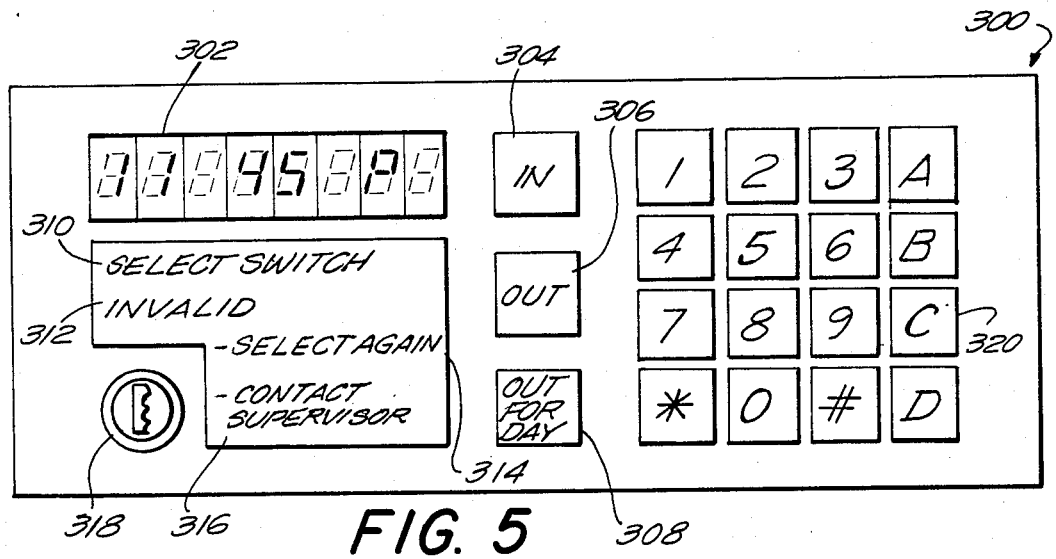
FIG. 2
FIG. 5
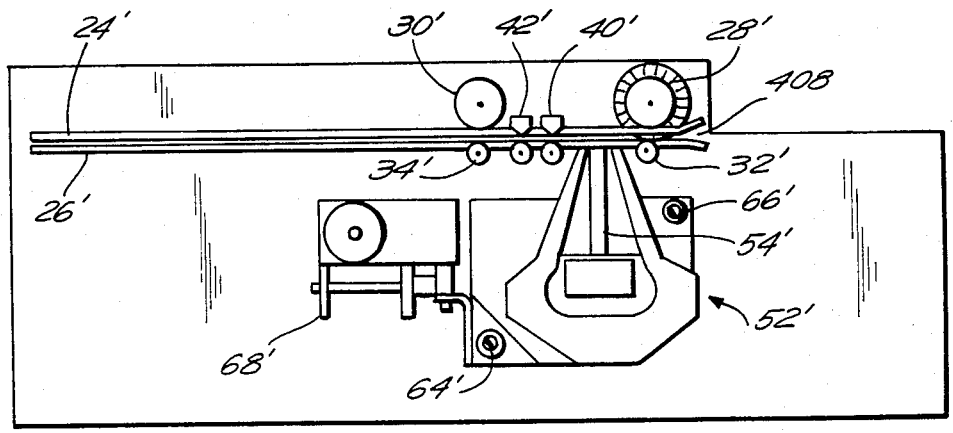
FIG. 8

APPARATUS AND METHOD FOR RECORDING BOTH MACHINE-READABLE AND PRINTED INFORMATION

This application is a continuation of application Ser. No. 417,507, filed Sept. 13, 1982 and Ser. No. 189,966 filed Sept. 23, 1980, both now abandoned.

This invention relates to a device and method for recording both machine-readable information and printed information on a recording member. Preferred embodiments of the invention relate to devices and methods for recording magnetic machine-readable information and printed information upon recording members such as time cards, ledger cards, or passbooks.

There are certain transactions for which it is desirable to create records bearing both visible printed information and machine-readable information; that is, information which usually is not easily readable by humans, but can be read easily by machines. Such machine readable information can be recorded magnetically, or by other known means. Examples of such records include employee time-cards, bank passbooks and ledger cards. On such cards, the machine readable record is made on a strip of magnetic recording material on the card, and the visible information is printed on other areas of the card.

Prior devices which have been provided for recording information on such cards usually have been undesirably expensive, large and slow. Accordingly, it is an object of the present invention to provide a relatively simple, inexpensive and high-speed device for recording both machine readable-information and printed information on a recording member. It also is an object to provide such a device which both records and reads said machine-readable information. Furthermore, it is an object to provide such a device which is relatively compact and reliable.

In accordance with the present invention, the foregoing objects are met by the provision of a device and method for recording information on a record member in both the machine-readable and visible form. In this device and method, the drive system which is used to move the record member into and out of the device also is used to create motion between the printer and the record member for spacing printed characters from one another. Thus, a single drive system is used for two different purposes.

In accordance with another feature of the invention, a single drive system is used to create relative motion between the record member (preferably a card) and both the recorder and the printer. Thus, a single drive system is used to create both recording motion and character spacing motion for the printer.

It is preferred that a single drive system be used for all three functions; to move the record member into and out of the machine; to move the record member past the recording means; and to move the record member past the printer so as to space the printed characters from one another.

The foregoing multiple uses of a single drive system greatly simplify and reduce the cost of the device.

The printer preferably is a dot matrix printer capable of printing columns of dots in a direction generally perpendicular to the motion of the recording member, so as to print lines of characters extending in a direction parallel to the motion of the record member. Means also are provided for moving the printer in a direction perpendicular to the motion of the record member in order to space the printed lines from one another.

In a preferred embodiment, the drive system includes transport means for moving the record card first in one direction and then in the opposite direction. When used in a time-card marking machine, the time-card is first drawn into the machine and then is ejected. The reading, recording and printing are done while the time-card is moving in this manner, thus making use of the time which otherwise might be wasted. This is believed to make the machine faster than many time-card printers.

The invention can be used in a plurality of different types of devices, such as in devices for recording both printed and machine-readable information upon time-cards, ledger-cards and bank passbooks.

In accordance with yet a further feature of the invention, a time recording device, such as a time-card machine, for recording the amount of time that has elapsed between a succession of starting times and their corresponding stopping times upon a recording member, such as a time-card, is provided which includes a transducer for reading magnetic information recorded on the time recording member and for recording magnetic information on the time recording member, electronic memory for storing information, means for storing in the electronic memory recorded information read from the time recording member, means for displaying the recorded information which is stored in the memory, means for editing the displayed information, and means for supplying the edited information to the transducer means for recording on the time recording member.

In accordance with yet another aspect of the invention, a time recording device is provided which includes means for magnetically reading a total amount of elapsed time from a time recording member, means for updating that total that has been read by adding to it the amount of elapsed time between a starting time and a corresponding stopping time, such as the starting and stopping times of a working shift, and means for recording that updated total upon the time recording member.

In accordance with yet another aspect of the invention, a time card recorder is provided for recording clocking times, such as clocking-in and clocking-out times at the beginning and end of a work period, for each of a plurality of employees upon a corresponding plurality of employee time cards, respectively, and for indicating a relationship between each employee's clocking times and a given time schedule from among a plurality of time schedules associated with such employees. The time card recorder includes means for storing each of the time schedules associated with such employees and means for reading a symbol from a time card that identifies which one of the time schedules is associated with that time card. The symbol is the same for a plurality of time cards associated with the same time schedule. In a preferred embodiment the schedule identifying symbol is stored magnetically on each time card.

The results of the foregoing features are a device and method which meet the objects set forth above. The recording device is simple in construction and thus is relatively inexpensive and easy to maintain.

The foregoing and other features, objects and advantages of the invention will be set forth in or apparent from the following description and drawings.

IN THE DRAWINGS

FIG. 2 shows a time-card used with the time-card recorder of FIG. 1;

FIG. 5 shows the control panel of the time-card recorder shown in FIG. 1;

FIG. 8 is a schematic cross-sectional view taken along the line 8—8 of FIG. 7.

GENERAL DESCRIPTION

Figure 1:
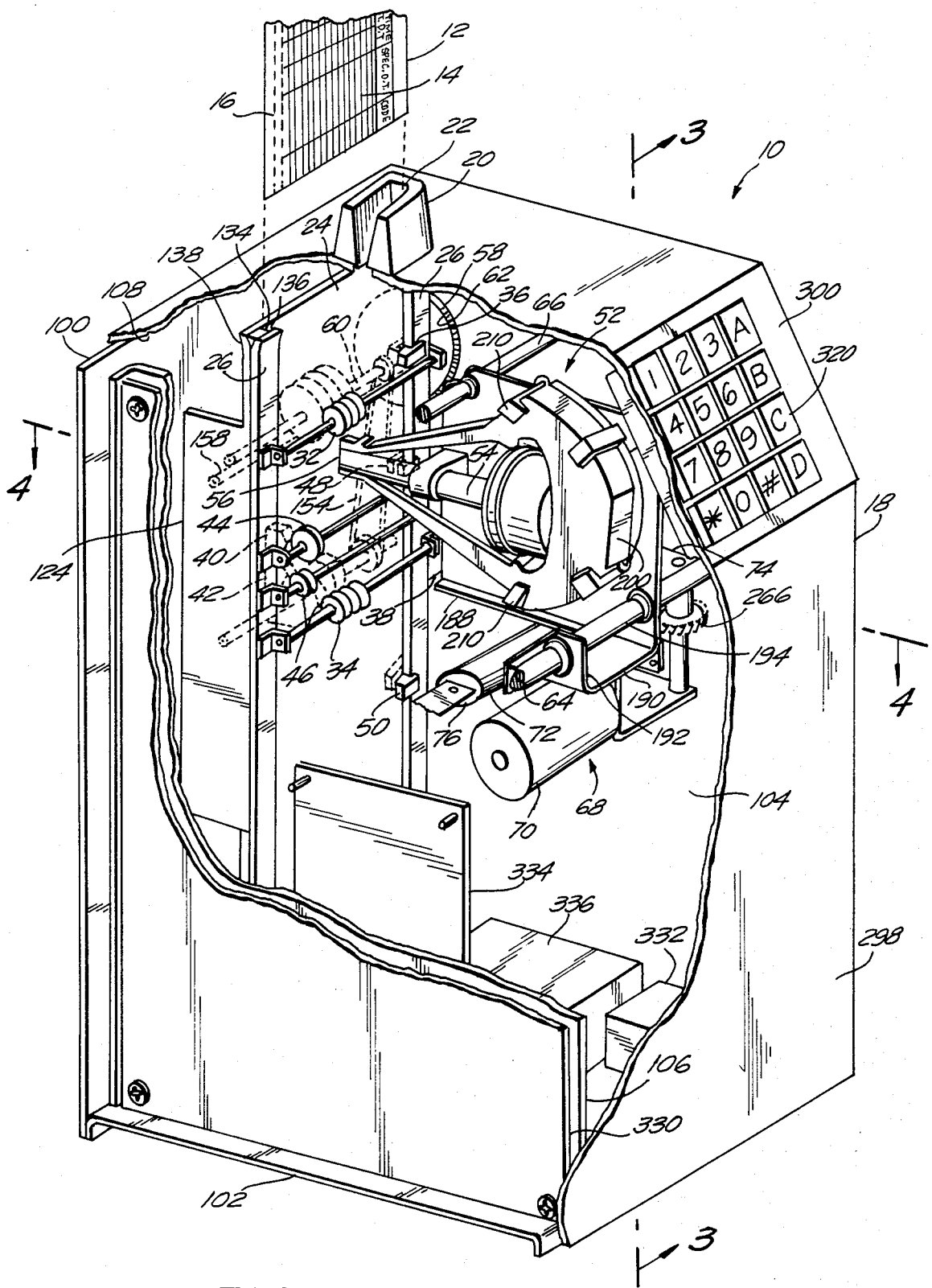
FIG. 1 is a front perspective view, partially broken-away, of a time-card recorder constructed in accordance to the present invention.

FIG. 1 shows a preferred embodiment 10 of a time-card recorder constructed in accordance with the present invention. The time-card recorder 10 records information concerning the amount of time worked by a given employee upon a time-card 12. The time-card 12 has an area 14 upon which printed information can be recorded, and magnetic strip 16, indicated by dotted lines in FIG. 1, located on the opposite side of the card from the printing areas 14.

The top of the housing 18 of the recorder 10 has a bezel 20 which contains a slot 22 which is designed to guide the time card 12 against a platen 24 and between parallel card guides 26 which are mounted at each side of the platen. The parallel card guides hold the card 12 against the platen 24 and prevent it from any substantial movement except in a direction parallel to the length of the platen.

Two pairs 28, 30 of large pinch rollers, shown in dotted lines in FIG. 1, are mounted behind the platen 24. There is an upper pair 28, and lower pair of rollers 30. These large pinch rollers extend through openings in the platen 24 so as to form nips with corresponding pairs 32 and 34 of small pinch rollers which are mounted on the front side of the platen 24. The nips formed between the large and small pinch rollers are located approximately in the plane of the front surface of the platen 24 so that the time card 12 can pass through that nip without being deformed. When a photodetector 36 which is placed along the platen 24 at a level just above the nips of the pinch rollers 28 and 32, detects that the card 12 has been placed in that nip, it causes a motor 38 to rotate the large pinch rollers 28 and 30 in a clockwise direction as shown in FIG. 1 so as to pull the card 12 down along the platen 24 into the recorder 10.

A magnetic read/write head 40 and a magnetic erase head 42, both shown in dotted lines in FIG. 1, are mounted behind the platen 24 with their recording and erasing tips extended through holes in that platen so as to be even with its front surface. Mounted opposite the recording head 40 is a pressure roller 44 and mounted opposite the erase head 42 is a pressure roller 46. A photodetector 48 detects when the front edge of the card 12 reaches the magnetic read/write head 40, and causes the magnetic head to start reading the magnetic information recorded on the strip 16 as the card 12 is moved by the pinch rollers 28, 30, 32 and 34 down along the platen. The erase head 42 is aligned after the read/write head 40 in the direction of the downward movement of the card 12, so that after magnetic information has been read by the head 40 it is then erased by the head 42.

A photodetector 50 is located one card length below the photodetector 36 along the length of the platen 24. The motor 38 causes the pinch wheels to continue moving the card 12 down along the platen until the photodetector 50 detects the presence of the card 12 in the lower portion of the platen 24 and the photodetector 48 indicates that the tailing edge of the card has cleared the read/write head 40 so that the entire magnetic strip 16 has had a chance to be read. Once this has happened the motor 38 changes its direction, causing the large pinch rollers 28 and 30 to rotate in a counterclockwise direction as shown in FIG. 1. This propels the card 12 upward along the platen 24 and out of the slot 22 in the top of the machine. As the magnetic strip 16 again passes the magnetic head 40, the head 40 magnetically records information upon the strip.

The relative movement between the card 12 and the platen 24 which enables the record head to record magnetic information upon the magnetic strip 16 also creates a relative movement between the card 12 and a printer assembly 52. The printer assembly 52 includes a seven-wire dot-matrix printer 54 which has a print head 56 mounted so as to be in close proximity with the printing area 14 of the card 12 as it moves along the platen 24. The timing of the printer 54 is controlled by a timing wheel 58 which is connected to the shaft 60 of the large pinch roller 28. This timing wheel 58 is mounted for rotation with the large pinch wheels 28 and it contains a series of evenly spaced timing slits located near its outer edge which are detected by a photodector (not shown in FIG. 1) and cause that photodetector to generate a signal the frequency of which is proportional to the rate of movement of the card 12. This signal is used to control the timing with which the dot matrix printer 54 prints upon the card 12, so that the resulting dot matrix information which it prints is properly spaced across the length of that card.

The printer assembly 52 is mounted upon a main printer support shaft 64 and a secondary printer support shaft 66. A printer indexing assembly 68 is provided which includes an indexing motor 70 designed to drive a wire 72 which is connected to the printer assembly 52 and which is extended between pulleys 74 and 76. The printer indexing assembly 68 causes the printer assembly 52 to move in a direction perpendicular to the platen 24, across the width of the card 12, so that the printer 54 can print in different rows upon the printing area 14 of the card 12.

As it is evident from the foregoing, the drive motor 38 and its associated drive mechanisms are used for three different functions; to move the time card into and out of the machine; to provide movement of the magnetic strip relative to the read/write head for magnetic reading and recording of information; and for spacing characters printed by the printer mechanism.

TIME CARD

FIG. 2 shows an example of a time card 12 which can be used with the time card recorder 10. In the area 14 for recording printed information it contains 16 rows, each for recording information in a given day during the two week or bi-monthly pay period. At each midnight during the pay period the printer assembly 52 is indexed so as to move the width of the platen 24 by the width of one row upon the card 12, so that in each successive day of a pay period data will be printed on a separate row of card 12. As it is shown in FIG. 2, each card 12 contains three IN columns 80 and three corresponding OUT columns 82. The IN columns 80 are for recording the time at which the card 12 is inserted in the time card recorder 10 at the beginning of a work period, and the OUT columns 82 are for recording the time at which that card is inserted in the time card recorder 10 at the end of each work period. During a normal work day there will be two work periods, but a third pair of IN and OUT columns is provided in case a worker clocks in more than twice during a given day.

The card 12 also contains a DAILY TOTAL column 84 and a DAILY OVERTIME TOTAL column 86 in which the time card recorder prints the total amount of hours that the worker has worked during a given day and the total amount of overtime that he has worked during that day, respectively, when the worker places the card 12 in the time card recorder for the last clocking out of the day. The card contains a TOTAL-TO-DATE column 88 and an OVERTIME-TO-DATE column 90 in which the time card recorder prints the worker's current total number of hours worked and current total number of overtime hours worked, respectively, during the current pay period when the card is placed in the time recorder during the last clocking out of the day. A SPECIAL OVERTIME column 92 is provided so that the printer can make a record of any special overtime work during a given day, and a CODE column 94 is provided so that the time card recorder can record additional coded information upon the card.

The magnetic strip 16, which is located on the back of card 12, has the following information recorded upon it:

(a) an employee number which identifies to which employee the card belongs;

(b) the last date at which the card was placed in the time card recorder;

(c) whether the card was being clocked in, clocked out, or clocked out for the last time of a given day when it was last placed within the time card recorder;

(d) the number of days the employee has been absent during the pay period;

(e) the next column on which the printer 54 is to print a clocking time when the card is next inserted into the time card machine;

(f) whether there has been, a previous error in the reading of the card or whether special overtime has been recorded on the card;

(g) the total number of hours worked during the pay period in minutes and hours;

(h) the total amount of time worked in the current day so far, in minutes and hours;

(i) the total amount of overtime which has been worked during the pay period in minutes and hours;

(j) the total amount of special overtime which has been worked during the pay period, in minutes and hours; and (k) the last time at which the card was placed within the time card recorder 10.

Thus, at the end of a pay period, all the information necessary for the calculation of an employee's pay check will be contained on the magnetic strip 16 of that employee's time card 12, and that card can be fed through a special reading machine which will read the magnetic strip 16 and feed the information into a computer for the calculation of financial records and printing of a paycheck. It should be noted that the visible printed information kept on the card 12 enables the values contained on the magnetic strip 16 to be verified should any dispute arise about the validity of those values The time card recorder 10 will now be described in detail.

HOUSING CONSTRUCTION

Figure 3:
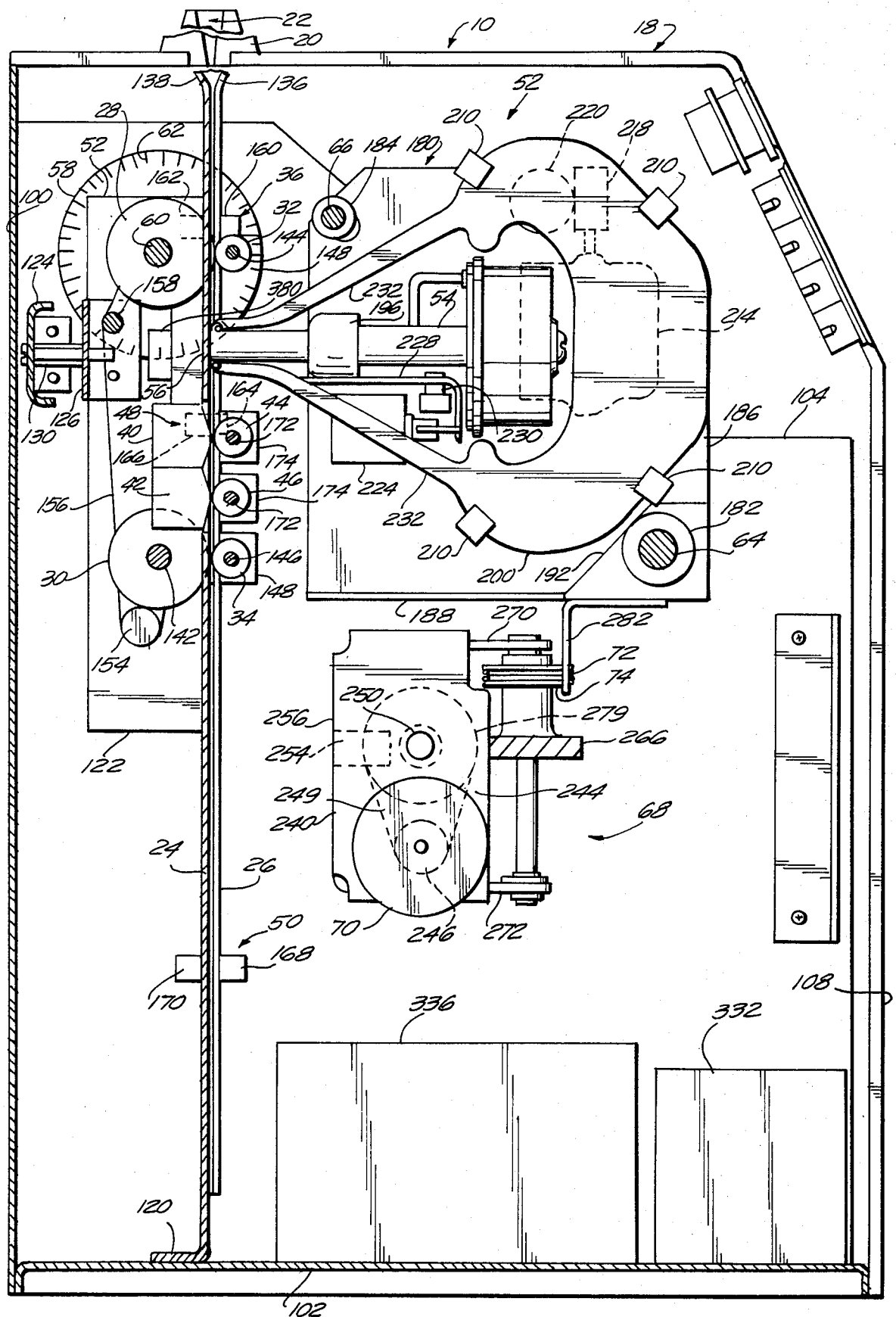
FIG. 3 is a cross-sectional view taken along the line of 3—3 of FIG. 1.
Figure 4:
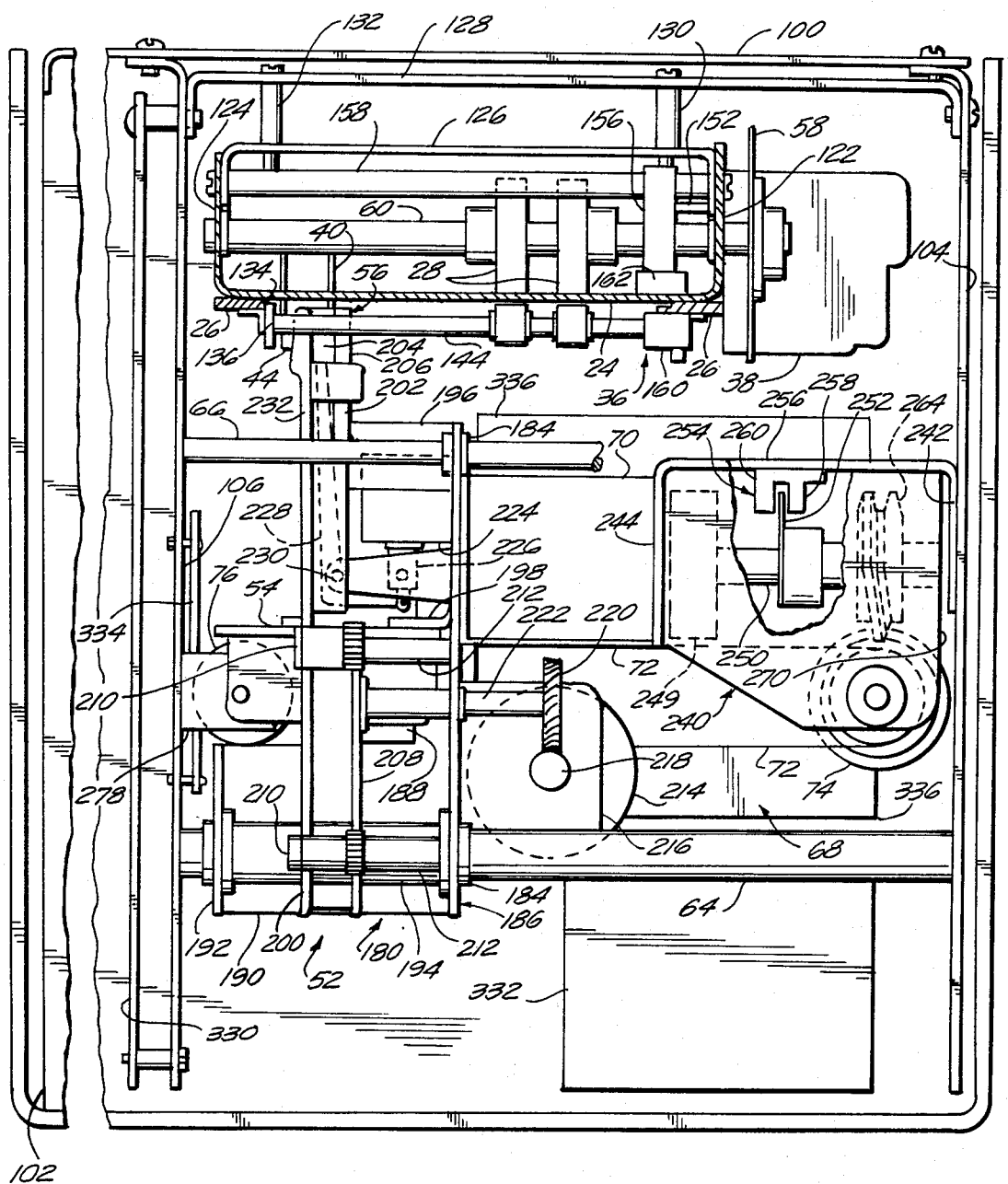
FIG. 4 is a cross-sectional view taken along the line 4—4 of FIG. 1.

Now referring primarily to FIGS. 3 and 4, the housing 18 of the time card recorder 10 includes a steel back wall 100 which is joined at its bottom with a steel bottom wall 102 to form an L-shaped configuration. Parallel steel bracing members 104 and 106 are connected to both the back and bottom walls to form a steel chassis that is both strong and rigid. The steel bracing members 104 and 106 are also used, as will be described in greater detail below, to support the printer and printer indexing assemblies 52 and 68.

A cover 108 made of injected molded plastic is mounted upon the chassis formed of the steel back and bottom walls 100 and 102 and the steel bracing members 104 and 106. The cover 108 has an opening in its back and bottom portion, the edges of which are designed to fit tightly against the steel back wall 100 and the steel bottom wall 102, so that the cover 108, in conjunction with the steel chassis, enclose substantially the entire interior of the time card reader 10. Although it is not shown in the drawings, the cover 108 contains a key lock which is designed to prevent unauthorized personnel from removing the cover 108 from the recorder's steel chassis.

CARD TRANSPORT SYSTEM

Still referring to FIGS. 3 and 4, the platen 24 which extends vertically within the time card recorder 10 has a flange 120 at its bottom which is connected to the bottom wall 102. The platen 24 also contains side flanges 122 and 124 which extend from the sides of the platen 24 near its top in a direction generally perpendicular to the width of that platen. The ends of the flanges which extend away from the platen are connected together by a strut 126. Parallel and opposite to the strut 126 is a strut 128 which is connected between the bracing members 104 and 106. Two adjusting screws 130 and 132 connect the strut 126 to the strut 128 so as to support the upper portion of the platen 24. By turning these screws the distance between each side of the platen 24 and the back wall 100 can be adjusted so as to keep the front surface of the platen 24 at a desired distance from the print head 56 of the printer 54.

Each of the two parallel card guides 26 mounted on the front surface of the platen 24 has a side edge 134 which extends vertically and perpendicular to the front surface to the platen 24. These two side edges 134 are spaced slightly further apart from each other than the width of the card 12, and they serve the function of preventing the card 12 from moving sideways. Each of the card guides 26 also contains an overhanging edge 136 which extends vertically and parallel to the front surface of the platen 24 and which is spaced from that front surface by little more than the thickness of the card 12. These overhanging edges perform the function of holding the card 12 against the front surface of the platen 24. In the upper portion 138 of the platen 24, the platen and its card guides are flared apart from each other so that a card which has passed through the slit-shaped opening 22 or slot in the bezel 20 will be guided into the space between the front surface of the platen 24 and the overhanging edges 136 of the card guides 26.

As was stated above, the time card 12 is moved along the length of platen 24 by rotation of the pinch rollers 28, 30, 32 and 34. The upper pair 28 is comprised of two rubber pinch rollers mounted close together near the center of the platen 24 upon a shaft 60 which is journalled in the side flanges 122 and 124. Similarly, the lower pair 30 is comprised of two rubber rollers mounted near the center of platen 24 upon a shaft 142 which is also journalled in the side flanges 122 and 124. A small rectangular hole is placed in platen 24 over each of the rollers of the pairs 28 and 30, so that those rollers can extend through the platen to the level of its front surface. Opposite each of the large rollers contained within the pairs 28 and 30 is mounted a small rubber pinch roller contained within the pairs 32 and 34, respectiv.ley. The small pinch rollers 34 are mounted upon a shaft 146. The shafts 144 and 146 are each journalled at their ends in brackets 148, so that each small pinch roller is pressed against a corresponding large pinch roller.

The card drive motor 38 (FIG. 4) is attached on the outside of the side flange 122, near the bottom of that side flange. Its motor shaft 152 extends through the side flange 122 and it contains a pulley 154 on its end. This pulley drives a belt 156 which extends around an idler shaft 158 and around the shafts 60 and 142 to rotate the pinch rollers 28 and 30.

The photodetector 36 is located at the side of the platen 24 just above the nib of the uppermost pinch rollers 28 and 32. This photodetector is comprised of two arms 160 and 162. The arm 160 contains a light-emitting diode ("LED") which is attached to one of card guides 26 so as to overhang the front surface of the platen 24. The other arm 162 contains a phototransistor and is located behind the platen 24 opposite the front arm 160. A hole is placed in the platen 24 between these two arms so that when a time card 12 is inserted into the nib between the pinch rollers 28 and 32 the light which normally passes between the arm 160 and the arm 162 is blocked, causing a signal to be generated which informs the electronic control circuitry of the time card recorder that the pinch roller should be rotated so as to pull the card down along the platen.

The photodetector 48 is comprised of an LED arm 164 and a phototransistor arm 166 which, like the corresponding arms of the photodetector 36, are mounted at the side of the platen 24 with the LED arm 164 located in front of the platen and the phototransistor arm 166 mounted behind a hole located in the platen. The photodetector 50 has an LED arm 168 and a phototransistor arm 170 which are similarly mounted on opposite sides of the platen 24. The photodetector 48 is mounted at a level equal to that of the magnetic read/write head 40, and the photodetector 50 is mounted at a level which is below the photodetector 36 by a distance equal to the length of the magnetic card 12. Once the insertion of the time card 12 first blocks the transmission of light between the arms 160 and 162 of the photodetector 36, the motor 38 will rotate the pinch rollers until the card has been moved downwardly to a point at which its trailing edge has cleared the photodetector 48, allowing light transmission between the arms 164 and 166 of that photodetector, and the card is located between the arms 168 and 170 of the photodetector 50, blocking the transmission of light between those arms. At this time, the control electronics of the time card recorder 10 will cause the card drive motor 38 to reverse its direction so that the pinch rollers move the time card 12 upwardly along the platen 24. This motion will continue until the trailing edge of the magnetic card has passed through the nip between the upper pinch rollers, so that the card 12 is free to be removed from the time card recorder 10, with its trailing edge extending out of the recorder housing.

It should be noted that the use of two separate sets of pinch rollers enables the entire length of the card 12 to be moved across the magnetic read/write head 42.

MAGNETIC HEADS

Still referring primarily to FIGS. 3 and 4, the magnetic read/write head 40 and the magnetic erase head 42 are mounted behind small openings in the platen 24 so that the gaps in their respective cores are positioned just about even with the front surface of the platen 24. The distances between both of these heads and the two parallel side edges 134 of the card guides 26 are the same as the distances between the entire length of the magnetic strip 16 and the two edges of the card 12, so that the entire length of the magnetic strip 16 passes over both of the magentic heads 40 and 42 hen the card 12 is moved along the length of the platen 24. The erase head 42 is placed immediately behind the read/write head 40 in the direction of the initial downward motion of the card 12 so that the magnetic head 40 will have a chance to read any data which may be on the strip 16 during that card's downward movement before that data is erased by the erase head 42. Similarly, when the card is moved upwardly, the magnetic head 40 will have a chance to record data upon magnetic strip 16.

Pressure rollers 44 and 46 are mounted on the front side of the platen 24 opposite the magnetic heads 40 and 42, respectively, so as to insure contact between the magnetic strip 16 which is located on the back of the time card 12 and each of the magnetic heads 40 and 42. The rollers 40 and 46 are mounted on roller shafts 172 which are journalled in brackets 174 mounted upon the card guides 26.

The photodetector 48, which is placed at a level equal to that of the magnetic read/write head 40, is used to help control the timing at which that head reads or writes signals upon the magnetic strip 16. The photodetector 48 does this by communicating to the circuitry which controls the operation of the magnetic head 40 the time at which the leading edge of a magnetic card 12 first passes that head and the time at which its trailing edge first clears that head.

PRINTER ASSEMBLY

Referring to FIGS. 1, 3 and 4, and primarily FIGS. 3 and 4, the printer assembly 52 includes a printer carriage 180 slidably mounted upon the main printer support shaft 64 and the secondary printer support shaft 66 by means of sliding bearings 182 and 184, respectively.

The printer carriage is comprised of a flat plate 186 which has a flange 188 located along its lower portion to give it extra strength. The portion of this flange 188 which is located furthest from the platen 24 contains an extension 190 which has an end that is bent upward so as to be parallel with the flat plate 186 of the carriage 180. A nylon spacer 146, which contains the sliding bearing 182 on its interior surface, extends between this parallel portion 192 and the first plate 186. The large extent of the sliding bearing 182 prevents the carriage 180 from wobbling and keeps it perpendicular to the main support shaft 64. For this reason, the secondary support shaft 66 is required to do little more than hold the upper corner of the print carriage 180 which is nearest the platen 24 up, and therefore the bearing 184 need not be very long in the direction of the shaft 66.

Mounted on the printer carriage 180 there is a seven-wire dot-matrix printer 54. As is best shown in FIG. 4, this printer is mounted on the carriage 180 by supports 196 and 198 so that its print head 56 is located very close to the front surface of a card 12 which has been placed between the platen 24 and card guides 26. Also mounted on the printer carriage 180 is a ribbon cartridge 200 which is designed to extend a two-colored ribbon 202 (best seen in FIG. 4) between the print head 56 and the front of a card which is positioned on the platen 24. The ribbon 202 contains a black portion 204 which is normally positioned over the seven printing wires of the dot-matrix printer 54, and a red portion 206 which, as will be explained below, can be moved so as to be positioned in front of those seven printing wires when it is desired to print in red upon the card 12.

The ribbon cartridge 200 is mounted upon a cartridge mounting plate 208 and it is held in position relative to that mounting plate by clips 210 which are spring-mounted on the cartridge mounting plate so as to push the ribbon cartridge against that mounting plate. The mounting plate 208 is connected to the printer carriage 180 by means of supports 212.

As is shown in dotted lines in FIG. 3 and partially in dotted lines in FIG. 4, a ribbon advance motor 214, which is a stepping motor, is supported on the printer carriage 180 by a mounting plate 216 which extends in a horizontal plane perpendicular to the flat plate 186 of the printer carriage 180 on the opposite side of that plate from the printer 54 and the ribbon cartridge 200. On the end of the rotor shaft of this ribbon advance motor 214 is a worm 218 positioned so as to drive a worm wheel 220 connected by a ribbon drive shaft 222 to the take-up reel of the ribbon cartridge 200, so that the operation of the ribbon motor 214 causes a fresh portion of the ribbon 202 to be placed in front of the printing head 56 each time that the printer 54 prints upon a card 12.

As can be seen in FIGS. 3 and 4, a color change solenoid 224 is mounted on the flat plate 186 of the printer carriage 180, and its plunger 226 is connected to a curved lever 228, which is mounted on a pivot shaft 230, which, in turn, is mounted on the flat plate 186 of the carriage 180. The end of the lever 208 which is not connected to the plunger 226 of the solonoid 224 is connected to the flexible plastic extension 232 of the ribbon cartridge 200 which extends the ribbon 202 around the front of the print head 56. When the solonoid 224 is energized, its plunger is pulled in towards its center, which causes the lever 228 to rotate about its pivot and thus causes the flexible extension 232 of the ribbon cartridge to be bent so as to position the red portion 206 of the ribbon 202 in front of the printing elements of the print head 56, thus enabling the printer to print in red characters upon the card 12.

PRINTER INDEXING ASSEMBLY

Still referring to FIGS. 3 and 4, an indexing drive housing 240 is attached to the side of the bracing member 104 which faces the printer carriage 180. This housing has six sides. One of its sides 242 is attached to the bracket member 104 and its opposite side 244 has the indexing motor 70 mounted on its outside face so that the rotor shaft of that motor extends perpendicularly through a hole in that side 244 into the housing 240. On the end of the shaft of the motor 70 is a drive pulley 246. This drive pulley propels a belt 248 to drive a driven pulley 249 mounted on a driver shaft 250 journalled in the two opposing sides 242 and 244 of the housing 240 above the indexing motor 70.

An indexing position indicating paddle 252 is mounted on the driven shaft 250 so as to extend radially from, and so as to rotate with, that shaft. A photodetector 254 is mounted on the side 256 of the housing 240 which faces platen 24. The photodetector 254 has an arm 258 containing an LED and another arm 260 containing a phototransistor. These two arms are placed so that the paddle 252 will extend between them once during the rotation of driven shaft 250, so as to enable the photodetector 254 to determine when the shaft 250 has made one complete revolution.

Still referring to FIGS. 3 and 4, also mounted on the driven shaft 250 is a worm 264. This worm drives a worm wheel 266 mounted on a worm wheel shaft 268 journalled at its ends in the top plate 270 and the bottom plate 272 of the housing 240. The pulley 74 is mounted on the worm wheel shaft 268 for rotation with that shaft. Another pulley 76 is mounted by a mounting bracket 278 upon the face of the bracing member 106 which faces the printer assembly 52. A wire 72 is wrapped around both of these pulleys so as to be driven by the rotation of the worm wheel 266. This wire is attached to a flange 282 which extends down from the bottom of the horizontal extension 190 of the printer carriage 180.

Thus it can be seen that when the indexing motor 70 rotates, the pulley 246 mounted on its rotor shaft drives the pulley 248, which, in turn, rotates the worm 264, causing the worm wheel 266 and the pulley 74 both to rotate. This causes the printer carriage 180 which is connected to the wire 72 to move in a horizontal direction so that the print head 56 moves across the width of the platen 24.

The printer indexing assembly 68 is designed so that one complete rotation of the worm 264 will cause the print head to move across the platen 24 by the width of one row upon card 12. The single slot contained in the pehriphery of the indexing position indicating wheel 252 will pass between the two arms 258 and 260 of the photodetector 254 after one complete rotation of the worm has been made, indicating to the control electronics of the time card recorder 10 that the rotation of the indexing motor should be ceased, thus causing the indexing assembly to stop moving the printer 54 after its position relative to the platen 24 has been changed by the width of one row upon the card 12. Normally, such indexing takes place at midnight on each day during a pay period, so that the day in which clocking times and totals are printed upon a time card 12 is indicated by the row in which they are printed upon that card.

FRONT PANEL

Referring now to FIGS. 1 and 5, and in particular FIG. 5, plastic cover 108 of the time card recorder 10 is slanted back toward the rear of the time card recorder to form a front panel 300. The front panel 300 contains an eight digit, seven-segment LED display 302 which is normally used to display the current time as measured by the clocking function of the control electronics of the time card recorder. However, this eight digit display can also be used for other functions, as will be explained below, such as displaying information contained upon the magnetic strip 16 of a card which has been inserted in the time card recorder, or for displaying certain contents of the memory of the control electronics of the time card recorder.

The front panel 300 also includes three push buttons, an IN push button 304, an OUT push button 306, and an OUT FOR THE DAY push button 308. If, upon the insertion of an employee's time card, it is the normal time for that employee to clock in, to clock out, or to clock out for the day, the card will be clocked in, out or out for the day as appropriate. For example, if it is time for an employee to clock out for lunch at the end of his morning work period, normally no action is required other than the insertion of his time card into the time card recorder. But if the employee desires to clock out for the day at that time, he should push the OUT FOR THE DAY button 308 to indicate to the time card recorder that his daily totals should be printed.

The front panel 300 also includes several prompt indicators, each of which includes a light mounted so as to selectively illuminate the transparent characters associated with a given prompt message. These prompt messages include a SELECT SWITCH prompt message 310, an INVALID prompt message 312, a SELECT AGAIN prompt message 314 and a CONTACT SUPERVISOR prompt message 316. The SELECT SWITCH prompt message is lighted when a time card is inserted into the time card recorder at a time when no normal clocking function is scheduled to be performed, such as during the middle of a working period, or when a clocking function is scheduled but the magnetic information included upon a card indicates that it would be inappropriate to perform that clocking function, such as if during a clocking-in period an employee first clocked in and then decided that he wanted to leave work and wanted to clock out. In such instances the SELECT SWITCH prompt tells the employee to pick one of the three push buttons 304, 306, or 308 to indicate the type of clocking function he wishes to perform.

The INVALID prompt message 312 is used in conjunction with either the SELECT AGAIN prompt message or the CONTACT SUPERVISOR prompt message. The front panel 300 issues the prompt "INVALID SELECT AGAIN" when a selection which has been made in response to the SELECT SWITCH prompt message has resulted in the selection of an inappropriate push button 304, 306 or 308, such as if an employee selects the IN push button 304 at a time when the magnetic information recorded upon his card 12 indicates that the last clocking function was also a clocking in. The front panel 300 issues the prompt message "INVALID CONTACT SUPERVISOR" if the employee selects an invalid function push button 304-308 two times in a row.

The front panel 300 includes a key lock 318 which is used to prevent unauthorized personnel from using the sixteen character key pad 320. Unless a proper key is inserted into the key lock 318 the control circuitry of the time card reader ignores the key pad 320. But once the appropriate key is entered into the key lock 318, the control circuitry reads the key pad 320 and enables an operator using it to perform such functions as changing information recorded in the memory of the time card reader's control circuit and editing information recorded upon the magnetic strip 16 of a time card 12 which is inserted into the time card recorder.

ELECTRONIC CONTROL CIRCUITRY

Figure 6:
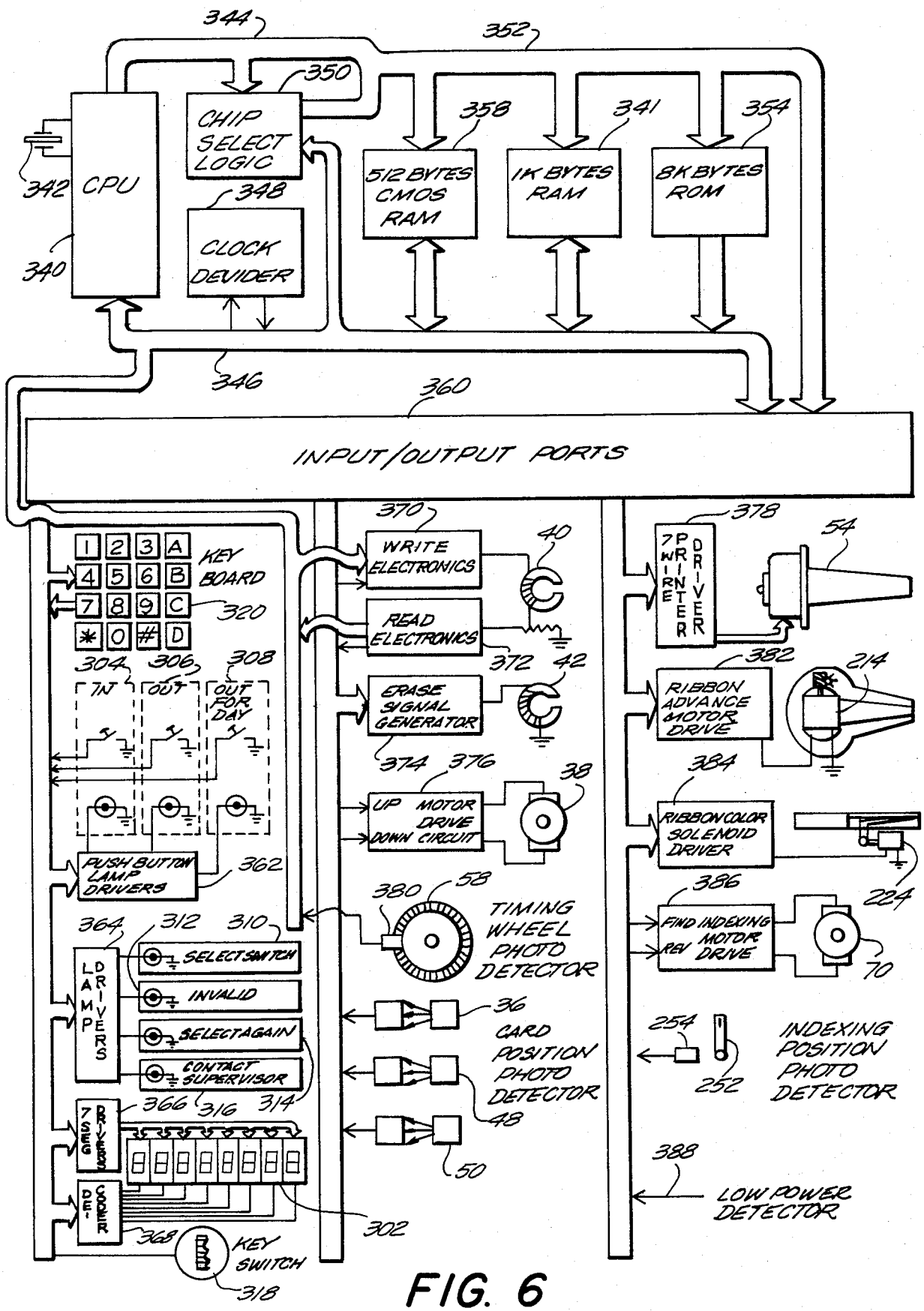
FIG. 6 is a schematic block diagram of the electronic control circuit of the time card recorder shown in FIGS. 1 through 5.

FIG. 6 is a schematic block diagram of the electronic control circuit used to control the time card recorder 10. The control circuitry is located upon a printed circuit board 330 shown in FIGS. 1 and 4. Also shown in these figures, but not shown in FIG. 6, is a step-down transformer 332, which receives alternating line current and reduces it to a lower voltage, a power supply board 334, which rectifies, filters, and regulates the stepped-down AC voltage provided by the transformer 332 to produce desired DC voltages for powering the electronic and electromechanical devices shown in FIG. 6, and batteries 336, which are charged by the power supply board 334 and which supply power to the card recorder during periods of AC electrical power failure and also during the times at which the current drawn by the various devices shown in FIG. 6 exceeds the capacity of the power supply board 334.

Referring still to FIG. 6, the heart of the electronic control system of the time card recorder 10 is its CPU 340, which is a standard, well-known product such as the model 8085A microprocessor sold by Intel Corporation. This CPU chip has a crystal 342 connected to it, and in conjunction with this crystal the CPU 340 generates a 3.072 mhz clocking signal which is used to control the internal timing of the CPU 340. The CPU 340 has an address bus 344 which it uses to indicate to and from where data signals transmitted over its data and control bus 346 are to go or to come, respectively.

A clock divider 348 is provided to divide the 3.072 mhz clock signal which is generated by the CPU 340 in conjunction with the crystal 342 and which is supplied by that CPU as one of the lines in the data and control bus 346. The divided output of the clock divider 348 is a 375 hz signal which is supplied as the highest priority restart interrupt to the CPU 340. Thus, everytime the clock divider 348 generates an output, which it does 375 times a second, the CPU 340 temporarily stops whatever program task it is currently performing and responds to the output of the clock divider 348 by reading a current time value which it has stored in a random acess memory ("RAM") 349 and by incrementing that time value by an amount representing 1/375th of a second. Then it stores that incremented time value back in memory 349, refreshes one of the seven segments LED displays in the eight digit display 302, as will be described below, and then returns to performing the program task that it was performing before it was interrupted by the clock divider 348. In this manner the CPU 340 in conjunction with the clock divider 348 and the memory 349, is able to keep accurate track of the current time, so that it can perform its time card recording functions.

A chip select circuit 350 receives the five higher order address lines of the sixteen line address bus 344 and the $\overline{\text{READ}}$ and $\overline{\text{WRITE}}$ lines from the data and control bus 346. The chip select circuit decodes these inputs to generate a chip select signal on a selected one of a plurality of chip select lines which are combined with the eleven lower-order lines of the address bus 344 to form a chip select and address bus 352. The chip select signals enable the CPU 340 to pick which of its memory chips and which of its input/output chips it is to supply information to or to receive information from.

Thus the chip select circuit 350 enables the CPU 340 to perform what is known in the art of microcomputer technology as "memory mapped I/O".

The control circuit of the time card recorder is provided with a read only memory ("ROM") 354 which includes 6,144 addressable memory locations, each of which includes one byte of eight binary digits. The read-only-memory ("ROM") 354 is addressed by the CPU 340 through the chip select and address bus 352 and in response to such addressing it supplies a byte of information at a time to the CPU 340 through the address and control bus 346. The ROM 354 is not capable of storing information written by the CPU 340, but only of supplying information to that CPU when addressed by it. For this reason its only use is for the storing of the operational program for the CPU 340.

The control electronics of the time card recorder includes separate RAM memories 349 and 358, each of which is capable of both storing and outputting information. Both of these memories are addressed by the CPU 340 over the chip select and address bus 352 and they supply data to that CPU 340 over the data and control bus 346. The memory 349 contains 1,024 separately addressable bytes of RAM memory which is used by the CPU to store variables generated during the operation of its various program functions, stored in the ram memory 354, such as its current count of interrupts from the clock divider 348, stored in the ram memory 354.

The ram memory 358 contains 512 separately addressable bytes of storage capacity, which are used to store information which customizes the time card recorder to the particular working environment in which it is used. This customization information includes:

(a) the range of employee card numbers which are to be used with the particular time card recorder;

(b) whether the time card recorder is operative on a weekly, biweekly, semi-monthly or monthly pay period;

(c) information which defines each of four different daily work schedules in terms of such information as their starting and stopping times, the clocking-in and clocking-out periods associated with these starting and stopping times, (d) definition of four different weekly programs, each of which assigns one of the four different daily schedules to each of the seven days of a week, and (e) a list which assigns each of the employee card numbers which is to be used with the time recorder to a given one of the weekly programs.

Thus, it can be seen that when a given worker inserts his time card into the time card recorder 10, the memory 358 contains enough information to determine which weekly schedule is associated with that employee's card number, and, for the current day of the week, which daily schedule is associated with that employee's weekly program, and what the appropriate clocking-in and clocking-out time are for each work period in that daily schedule.

The memory 512 also includes space for recording the current time in terms of seconds, minutes, hours, the day of the week, the day of the month, the month, the year, whether or not it is currently a leap year, and the day of the current pay period. The memory 358 futher includes 16 bytes of memory into which the sixteen bytes of information stored upon the magnetic strip 16 of a card 12 are stored each time such a card is placed into the time card recorder 10.

The memory 358 is a complementary metal oxide semiconductor ("CMOS") memory which requires very little current to accurately maintain the information stored within it. This enables the information which is stored within the memory 358 to be maintained for weeks at a time by the batteries 336 even if no AC power is supplied to the time card recorder 10, so that it usually is not necessary for the detailed information concerning daily schedules, weekly programs and weekly program assignements of each worker to be entered into the memory 358 more than once.

Referring still to FIG. 6, the CPU 340 controls most of the electronic and electrical devices in the time card recorder 10 through input/output ports 360 which are standard, well known products such as the model 8255A-5 programmable peripheral interface chips sold by Intel Corporation. As is well known in the art of microcomputer systems, such input/output ("I/O") ports enable their associated CPU to transmit a binary signal to or to receive a binary signal from a selected one of a plurality of peripheral devices, such as those which are shown below the input/output ports 360 in FIG. 6.

The CPU 340 communicates with the front panel 300 through the input/output ports 360. Each of the 16 keys of the keyboard 320 has the capacity to connect one of four strobe lines which are output by the I/O ports 360 to one of four input lines which are supplied to the I/O ports 360 by that keyboard. When the CPU 340 wishes to read the keyboard 320, it causes the I/O ports to strobe each of these four strobe lines in succession, and during the strobing of each such strobe line it reads each of the four outputs produced by the keyboard 320 to determine which, if any, of the four keys associated with that strobe line has been pushed.

Each of the push button switches 304, 306 and 308 is connected to one input of the I/O ports 360, so that each of those switches can be selectively read under the control of the CPU 340. Each of the lamps which is associated with each of those push buttons has a separate output line from the I/O ports which is fed into a separate push-button lamp driver 362 for the purpose of powering it. Similarly each of the lamps which is used to illuminate each of the prompt messages 310, 312, 314, and 316 has associated with it an output line from the I/O ports 360 which is passed through a separate lamp driver 364. Thus it can be seen that the CPU 340 has the capacity to selectively illuminate the push buttons 304, 306 and 308 and the prompt messages 310, 312, 314 and 316.

The I/O ports 360 have seven output lines which are supplied to a seven segment display driver 366. This driver has an output which is associated with each of those seven outputs from the I/O ports 360 that is used to illuminate a corresponding one of the seven LED segments contained within each of the eight seven-segment LED displays contained within the eight digit display 302. Thus at any give time the seven-segment display driver 366 is providing the same signal to each of the eight seven-segment displays in the display 302. The I/O ports 360 also supply four lines to a decoder 368 which is used to select which of the eight display digits of the display 302 is to be lit at any given time. The CPU 340 rapidly supplies a succession of eight separate values to the seven-segment driver 366 and uses the decoder 368 to cause each such value to be lit upon a separate seven-segment display, causing eight separate digits to be written on the display 302 with a minimum number of output lines. In practice the CPU 340 causes a separate display digit to be illuminated on the display 302 once everytime that the clock divider 348 provides it with a restart interrupt 375 times a second. Thus each of the eight digits of the display 302 is refreshed approximately 47 times a second, enough to make it appear that each of those digits is constantly lighted.

Referring still to FIG. 6, the input/output ports 360 receive one input from the key switch 318 which indicates whether or not the appropriate key has been inserted into that lock, so that the CPU 340 knows whether or not it should pay attention to instructions being given to it upon the keyboard 320.

The write electronics 370 for the magnetic read/write head 40 receive a write enable output from the I/O ports 360. They also receive the 375 hz output of the clock divider 348 as a clocking signal and the SERIAL OUT DATA line from serial output port contained within CPU 340. When enabled, the write electronics 370 synchronize the information on the SERIAL OUT DATA line with the 375 hz clocking signal so that each of the output bits provided by the serial output port of the CPU 340 can be recorded upon the magnetic strip 16 of a card 12.

The read electronics 372 associated the read/write head 40 supplies a strobe input to the input/output port 360 and it is connected to the SERIAL DATA IN line of the serial input port contained within the CPU chip 340, so that the CPU can directly read each of the data bits recorded upon a magnetic strip 16 of a card 12.

The I/O ports 360 provide an output signal to an erase signal generator 374 which determines when the magnetic erase head 42 generates an erase signal. Such an erase signal is always generated during the normal writing of a magnetic strip 16.

As is shown in FIG. 6, the I/O ports 360 supply two inputs to a card motor drive circuit 376. One such output causes the motor drive circuit to supply current to the card motor 38 in such a polarity that the pinch rollers 28, 30, 32 and 34 will draw a card down along the length of the platen 24. The other of the outputs will do just the opposite so that a card will be pushed up along the length of the platen 24.

The I/O ports 360 receive one input line from each of the phototransistors associated with each of the card position photodetectors 36, 48 and 50, enabling the CPU 340 to determine whether or not there is a card between the LED and the phototransistor of each of those photodetectors.

The I/O ports 360 provides eight output lines to a seven wire printer driver 378. Seven of them determine which of the seven aligned wires of the printer 54 will be used at any given time to print dots upon the surface of the card 12. The eighth of these outputs is used to control the timing with which the printing occurs.

The CPU 340 controls the timing at which these eight outputs are supplied to the printer driver 378 in conjunction with the operation of the timing wheel photodetector 380. The photodetector 380 has two arms which are placed on opposite sides of the peripheral edge of the timing disc 58, one of which contains an LED and the other with which contains a phototransistor. Since timing wheel 58 is mounted on the same shaft as the pinch rollers 28, its rate of rotation is proportional to the rate of travel of a card 12 which has been placed upon the platen 24. The photodetector 380 generates an output pulse each time one of the evenly placed timing slits 62 passes between its LED and phototransistor. Thus, the frequency of the output of the photodetector 380 is proportional to the rate of motion of a card 12 upon the platen 24. The output of the photodetector 380 is applied directly to a restart interrupt of the CPU 340. Each time such a pulse is generated the CPU 340 reads a value from the memory 349 which indicates the present position of the card 12 relative to the printer 54, increments that value, and then restores it in memory. If the program being executed by the CPU 340 indicates that a dot matrix column is to be printed in that position, the CPU 340 will then cause the I/O ports 360 to supply eight output signals to the printer driver 378 so as to print a column of dot matrix information upon the card 12.

It should be noted that the interrupts generated by the photodetector 380 are of lower priority than the interrupt generated by the clock divider 348. As a result whenever the CPU 340 is responding to a higher priority interrupt from the clock divider 348 it will not respond to a lower priority interrupt from the photodetector 380 until it has finished responding to the interrupt from the clock divider 348. Similarly if a higher priority interrupt is generated by the clock divider 348 during the time that the CPU 340 is responding to a lower priority interrupt generated by the photodetector 380, it will temporarily delay completion of its response to the interrupt generated by the photodector 380 until it has completed its response to the interrupt generated by the clock divider 348. The higher priority accorded to the interrupt of the clock divider 348 helps prevent any of its output pulses from being miscounted by the CPU 340 and thus helps to keep the current time value counted by the CPU 340 accurate.

Referring still to FIG. 6, during the printing of each row of dots by the dot matrix printer 54, the CPU 340 causes the I/O ports 360 to generate an output to a ribbon advance motor drive circuit 382, which, in turn, causes the ribbon advance stepping motor 241 to advance the ribbon 202. This insures that there will be fresh ribbon in front of the print head 56 so that it can print clearly legible characters upon the card 12.

The I/O ports 360 also have one output connected to the ribbon color solonoid driver 384, which, in response to that output causes the solonoid 224 to be energized, thus rotating the lever 228 which causes the flexible extension 232 of the ribbon cartridge 200 to be bent so as to place the lower, red part of the print ribbon 202 in front of the print head 56, so that any character printed upon the card 12 will be in red. Such red characters are used to highlight unusual information which is printed upon a card 12.

The I/O ports 360 provide two outputs to the indexing motor drive circuit 386, one of which causes that drive circuit to rotate the indexing motor 70 in a direction that propels the printer assembly 52 (as shown in FIG. 4) in a forward direction away from bracing member 104 toward the bracing member 106 so that the position of the print head 56 relative to the width of a card 12 placed upon platen 24 will be lowered. The other of the two outputs supplied to the indexing motor drive circuit 86 causes the drive circuit to rotate the motor 70 in the opposite direction so as to raise the print head 56 relative to the rows on a card 12 placed on platen 24.

The output of the photodetector 254 is supplied through the I/O ports 360 to the CPU 340.

When the current time and date information stored by the CPU 340 in its memory indicates that it is midnight of any day except the last day of a pay period, the CPU 340 will cause the I/O ports 360 to supply a signal to the indexing motor drive circuit 386 that will cause that motor to rotate the forward direction so as to lower the relative position between the print head 56 and the width of a card 12 placed upon the platen 24. This rotation of the motor 70 will continue until the paddle 252 makes one complete revolution and again is positioned between the LED arm 258 and the phototransistor arm 260 of the photodetector 254. At this time the photodetector 254 sends an input to the I/O ports 360 which is read by the CPU 340, causing that CPU to send a signal through the I/O ports 360 which ceases the motion of the motor 70. Thus at midnight during each day of a pay period except for the last day the position of the print head 56 is moved so as to print on the next row of the cards 12.

When the time and date information stored by the CPU 340 in its memory indicates that it is midnight of the last day of a pay period, the CPU 340 sends through its I/O ports 360 a signal to the index motor drive circuit 386 which causes that circuit to rotate the motor 70 in the reverse direction, so as to raise the relative position between the print head 56 and the width of a card 12 placed upon the platen 24. The CPU 340 allows this rotation to continue until the fifteenth successive time that the photodetector 254 indicates that the single slit within the index position wheel 254 has passed between its two arms. After fifteen such rotations the print head 56 is positioned so that it will print upon the top row of a card 12, as is appropriate at the beginning of a new pay period, and the CPU 340 will send a signal to the indexing motor drive circuit 386 through the I/O port 360 which will cause the motor 70 to cease its rotation.

Referring again to FIG. 6, the I/O ports 360 also receive an input 388 from a low power detector located on the power supply board 334. This line enables the CPU 340 to determine when the amount of charge left in the batteries 336 (shown in FIG. 1) is no longer sufficient to power normal operation of the time card recorder 10. At this time the CPU 340 uses relays, which are not shown, to disconnect all of the circuitry shown in FIG. 6 from the batteries except for the CMOS memory 358, so that the remaining charge left within the batteries can be used to maintain the information contained within that memory for a period of weeks.

UNATTENDED OPERATION

During normal operation of the time card recorder 10 the CPU 340 continuously repeats a program loop which checks (a) the output of the photodetector 36 to see whether or not a card 12 has been placed in the time card recorder 10, (b) the output of the key switch 318 to determine whether or not a key has been placed in that key switch in order to enable control of the time card recorder via the key board 320, and (c) the output of the low power detector 388 to determine whether or not the electronic control circuitry of the time card recorder has sufficient power to continue its normal operation.

As long as none of these three conditions occurs, this loop is continuously repeated, only being interrupted 375 times a second by the output of the clock divider 348. Each time the CPU 340 is interruped by the clock divider 348 it increments the value of its current time count and it refreshes the next digit of the current time value which it is currently displaying on the eight digit display 302. Once one of these interrupts has been responded to, the CPU 340 continues its program loop of checking for insertion of a time card, for the insertion of a key, and for a power failure.

RESPONSE TO THE INSERTION OF A TIME CARD

When the CPU 340 reads the input from the photodetector 36 and finds that a time card has been placed into the nip between the pinch rollers 28 and 32, it ceases performing its normal loop and sends a signal to the card motor drive circuit 376 which causes the card motor 38 to rotate in a direction which causes the pinch rollers to pull the card 12 down along the platen 24. When the leading edge of the card passes the photodetector 48 the CPU looks for a read strobe from the read electronics 372 associated with the read/write head 40. When such a strobe is read the CPU shifts in the associated data bit on its SERIAL IN DATA line, and it repeatedly performs this process until all sixteen bytes from the magnetic strip 16 upon the card 12 have been read by the CPU and stored in the CMOS memory 358. The card 12 continues its downward movement until it blocks the light between the two arms of the photodetector 50, indicating that the card is in a down position, and ceases to block the light between the two arms of the photodetector 48, indicating that the entire magnetic strip 16 has passed the read/write head 40.

Once the 16 bytes from the magnetic strip 16 have been read into the CMOS memory 358, the CPU is programmed to take the employees card number which has been read from that magnetic strip and to use it to find out which of the four weekly program assignments has been associated with that card number in the data stored in the CMOS memory 358. Then the CPU reads the current date which it has stored in memory 358 when performing its timekeeping function to determine which day of the week it is, and then it finds out what the daily schedule is for that day of the week in the weekly schedule associated with the card number read from the magnetic strip 16. Then the CPU reads that portion of its memory which records the current time in minutes and hours to determine if the current time fits within any of the scheduled clocking-in or clocking-out times of the current daily schedule appropriate for the card 12.

If the current time falls within an appropriate clocking-in, clocking-out, or clocking-out-for-the-day time, the CPU then performs the clocking function. This will be done unless the last clocking type recorded upon the magnetic strip 16 indicates that it would be inappropriate to perform the scheduled clocking function. For example, even if a worker's schedule indicated that it is the appropriate time to clock in for a day, if the last clocking type was a clocking-in then the CPU will determine that it would be inappropriate for the card to be clocked in a second time in a row. If such an error exists the CPU causes the prompt message 310 or a combination of the prompt message 312 and 316 to be lighted to indicate that the worker should contact his supervisor.

If there is no conflict and the card is clocked in, clocked out or clocked out for the day, unless the employee pushes one of the other push buttons, indicating that another form of the clocking operation is to be performed. For example, if an employee inserts his card into the machine at a time for which he is scheduled to clock out for lunch and he desires to clock out for the day, he should push the OUT FOR THE DAY push button 308. If a push button selected by a worker is inappropriate, either considering the time of day, or the last clocking type recorded upon the magnetic strip 16, the CPU 340 uses the prompt message 312 to indicate that such a selection is invalid and it uses the prompt messages 314 and 316 to indicate that another selection should be made or that the worker should contact his supervisor. Similarly if a card is inserted into the machine at a time during which the schedule does not indicate a normal clocking-in, clocking-out or clocking-out-for-the-day time the CPU 340 causes the SELECT SWITCH prompt message 310 to be generated, requesting the employee to indicate the type of clocking transaction he desires, and if the type of transaction selected is inappropriate the CPU 340 sends a prompt message indicating either that another push button should be selected or that the supervisor should be contacted.

CLOCKING IN

If the IN push button is selected, either automatically by the CPU 340 or by an employee, after a card has been inserting into the time card recorder 10 and the contents of its magnetic strip 16 have been recorded in memory 358, the CPU checks to make sure that the last clocking type read from the magnetic strip 16 was not a clocking in. If it is not, the CPU proceeds to perform a clocking-in function. In such a function the CPU alters certain of the sixteen data bytes which have been read from the magnetic strip 16 and stored in the CMOS memory 358. In particular, it updates the last clocking date and the last clocking time to those of the current date and time, it changes the last clocking type to indicate a clocking in, and it increments the byte which indicates in which of the first six columns 80 or 82 of the time card 12 the next clocking time is to be recorded by the printer 54. Then the CPU 340 sends an output to the card motor 38 which causes the pinch wheels 28 and 30 to rotate in a direction that propels the card 12 upward along the platen 24. When the top edge of the card 12 passes between the two arms of the photodetector 48 the CPU causes the write electonics 370 to rerecord the card's sixteen bytes, as those sixteen bytes have been updated by the CPU 340. In conjunction with the interrupts generated by the timing wheel photodetector 380 the CPU 340 keeps track of the extent of the card travel along the platen 24. The CPU uses the value of the next print column byte read from the strip 16 during its downward movement along the platen 34 to determine in which of the three IN columns 80 the printer 54 should print the current time. When the upward motion of the card places the proper IN column in front of the print head 56 the CPU sends data and timing signals to the print driver 378 to cause the printer 54 to print the current time in that column. The motor 38 continue is rotation until the timing wheel photodetector 58 indicates that the card has passed the nip between pinch rollers 28 and 32 and thus is free to be withdrawn from the time card recorder 10. At this time the clocking-in procedure has been completed.

CLOCKING OUT

When the OUT push button 306 is selected by the CPU 340 or by an employee after a card has been inserted and the contents of its magnetic strip 16 have been recorded in the memory 358, all of the functions discussed above with regard to the clocking-in function are performed, except that the last clocking type which is recorded upon the magnetic strip 16 is a clocking-out rather than a clocking-in, and when the printer 54 records the clocking time upon the card 14 it does so in an OUT column 82 rather than an IN column 80. In addition, during a clocking-out, while the card 12 is stopped at its lower most point of travel, the CPU 340 takes the last clocking time which has been read from the magnetic strip 16 into the CMOS memory 358 and subtracts that clocking time from the current time counted by the CPU 340 to calculate the time that has elapsed since the last clock in. Then the CPU reads the daily time total which has been read from the magnetic card 16 into the CMOS memory 358 and adds to it the elapsed time that it has just calculated to find a new updated daily time total and then it records this new updated daily time total back into the appropriate location in the CMOS memory 358 for recording onto the magnetic strip 16 during the upward travel of the card 12.

During the clocking-out function the CPU also reads the total time value which has been read from the magnetic strip 16 and recorded into the CMOS memory 358 and increments that total time by the amount of the elapsed time which has been worked since the last clocking-in, so that the total time recorded upon the magnetic strip 16 during the card 12's upward movement is updated.

CLOCKING OUT FOR THE DAY

The function of clocking out for the day, which is performed when that push button is selected by a worker, includes all of the functions performed during the clocking-out function except that during the clocking-out-for-the-day function the value of the next print column read from the magnetic strip 16 and stored in the CMOS memory 358 is not incremented, but instead is reset to zero, so that when the card is next inserted into the time card recorder for clocking in the clocking time will be recorded in the first IN column 80. Similarly, the daily time total and daily overtime total which are to be recorded onto the magnetic strip 16 are also reset to zero so that at the start of the next day they will be zero as is appropriate.

The clocking-out-for-the-day function also includes several additional functions which are not found in the clocking-out function. For example, during the upward travel of the card 12 during the clocking-out-for-the-day function the printer 54 records the updated value of the daily time in the DAILY TOTAL column 84. The CPU 340 also takes the daily time total and compares it with a value previously stored in the CMOS memory 358 by means of the keyboard 320 to determine whether that total exceeds the total number of hours which may be worked without paying overtime. If it does the CPU 340 calculates the total amount of daily overtime and causes that total recorded on the magnetic strip 16 and to be printed in the column 86 during the upward movement of the card 12. The CPU 340 also takes this value of daily overtime and adds it to the total overtime value which has been read from the magnetic card 16 so that the total overtime value which will be recorded upon that strip during the upward movement of the time card 12 will be an updated total, and it causes this updated total to be recorded in the OVERTIME TO DATE column 90. The CPU also causes the updated total time value for the current pay period to be printed in the TOTAL TO DATE column 88.

EDITING FUNCTIONS

When the CPU 340, in the performance of its standard loop of checking the photodetector 36 for the insertion of a card, the key switch 318 for the insertion of an appropriate key, and the low power line 388 for the detection of a power failure, senses the insertion of an appropriate key into the switch 318, it ceases to perform that loop and instead constantly monitors the keyboard 320 for an instruction to perform one of several editing functions. The possible editing functions which can be performed include:

(a) the defining of daily schedules, weekly programs, the length of the pay period to be used, (b) the defining of which of the four defined weekly programs are to be associated with each of the card numbers assigned to a given time card recorder, (c) the setting of the time and date of the time card recorder, (d) the editing of selective addresses in the CMOS memory 358, (e) the editing of any of the sixteen bytes contained on the magnetic strip 16 of a card inserted into the time recorder, and (f) the crediting of an employee's absence.

The functions of loading and editing information into the CMOS memory 358 need little explanation since the transferring of information from a keyboard to a designated portion of a microcomputer's memory is a commonly performed function in the microcomputer arts.

The function of editing a time card, however, is more unusual and thus deserves explanation. When a key operator has indicated by means of typing a predetermined code into the keyboard 320 that he has selected this function, the CPU 340 will wait until the photodedetector 36 detects the insertion of the time card to be edited. At that time the CPU will cause the motor 38 to pull the card down into the time card recorder, so that all of the 16 bytes on its magnetic strip 16 can be read by the magnetic head 40 and placed into the CMOS memory 358, as is performed during normal clocking operations. Then the CPU 340 will wait for the key operator to selectively edit the sixteen bytes in the CMOS memory 358 in which the information from the magnetic strip 16 is stored. The key operator indicates to the CPU 340 that he has completed his editing operation by pushing the number sign key on the keyboard 320. At this time the CPU 340 causes the motor 38 to propel the card 12 upward along the platen 34 and it causes the write electronics 370 to record the edited sixteen bytes back onto the magnetic strip 16.

When the key operator indicates that he wishes to perform the function of crediting an employee's absence by typing in a predetermined code on the keyboard 320, the CPU 340 waits for the photodetector 36 to indicate the insertion of a card, at which time the CPU 340 causes that card to be drawn down into the time card recorder 10 and causes each of the sixteen bytes on its magnetic strip 16 to be read into its appropriate address in the CMOS memory 358. At this time the supervisor selects the desired clock function, either a clocking-in, a clocking-out, or a clocking-out-for-the-day function, and a desired time. When the card 12 is ejected from the time card recorder the printer prints out the clocking time which has been entered by the key operator and underlines it to indicate a credited absence. The total times recorded upon the magnetic card strip 16 do not reflect the time absent.

IDENTIFICATION OF TIME CARD BY EMPLOYEE SCHEDULE RATHER THAN EMPLOYEE NUMBER

In the above described embodiment of the description it was stated that the time card 12 has recorded upon its magnetic strip 16 an employee number which is associated with a a given employee and which is used by the CPU 340 to look up, in a list contained within the CMOS memory 358, which of the four weekly programs the employee who has that card is to be on. In another embodiment of the invention the magnetic card 12 has recorded upon it the weekly program which is to be associated with its employee. This does away with the requirement that the time card recorder 10 contains within its memory a list of employee card numbers and their corresponding weekly programs, since it enables the CPU 340 to determine the employees weekly schedule merely by reading it from the magnetic strip 16. This result not only in a memory saving in the control electronics of the magnetic time recorder, but it also enables an unlimited number of time cards to be used in conjunction with each time card recorder, since it is no longer necessary for a card to be used with a recorder which has a designation of that card's weekly program stored within in it.

The identification of an employee's schedule in machine readable form upon a time card is of a great advantage, particularly in large factories which have many employees and many time card recorders. Formerly, in such large factories, it was commonly the case that a given card could only be used with the one of that factories' many time card recorders which had recorded within it a designation of that particular employee's weekly program. By means of identifying a time card by schedule type it is possible to use it in any one of a plurality of a factory's time card recorders.

USES AND VARIATIONS

It is envisioned that the present invention will have wide utility in the many applications in which it is desirable to record both machine readable and printed information upon a recording member. For example, it is intended that the invention be used not only in conjunction with time card recorders but also in conjunction with such transaction recording devices as ledger card printers and bank passbook printers.

Figure 7:
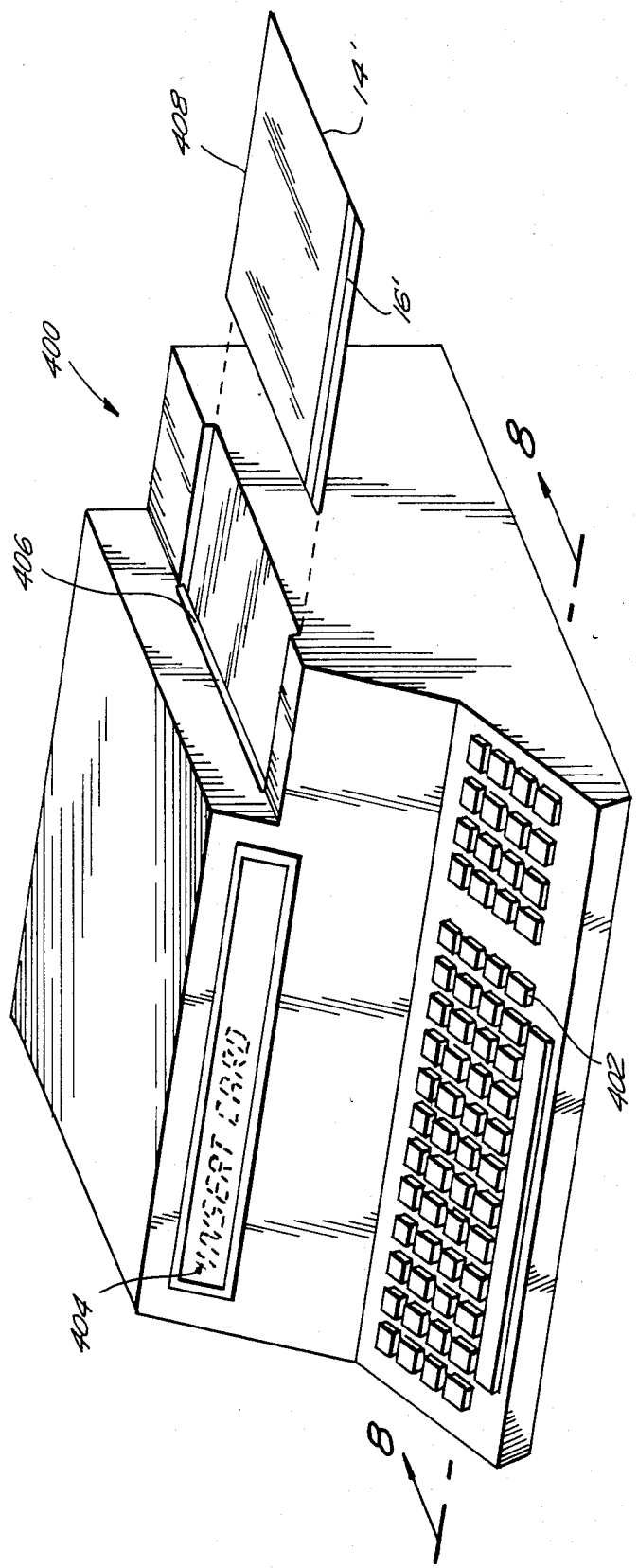
FIG. 7 is a front perspective view of a device for recording both machine readable information and printed information on a recording member in accordance with another embodiment of the present invention.

FIG. 7 illustrates a transaction recorder 400 which includes a keyboard 402 for the entering of information, a thirty-two character gas plasma display 404 for displaying alpha-numeric information and an opening 406 for receiving a recording member 408 upon which magnetic information and printed information can be recorded. The recording member 408 can be a ledger card for recording transactions relating to a given account, or a bank passbook in the form of a card which can be folded in half for more convenience in carrying. The recording member 408 contains a magnetic strip 16' on its top side and a printing area 14' on its underside, as shown in FIG. 7.

FIG. 8 is a schematic cross-sectional view of the transaction recorder 400. It shows that the card movement, the magnetic reading, writing and erasing, and the printing apparatus of the transaction recorder 400 can be constructed in a manner very similar to the corresponding apparatus of the time recorder 10 shown in FIGS. 1 and 3-4. When the recording member 408 is placed in the opening 406 it is guided between a platen 24' and a pair of parallel card guides 26' which are quite similar to platen 24 and the card guides 26 of the time card recorder 10 except that the platen 24' extends horizontally instead of vertically and is wider than platen 24. The transaction recorder 400 also includes pinch rollers 28'; 30'; 32';and 34' which are driven by a motor (not shown) to drive the recording member 408 into the transaction recorder 400 along the platen 24' so that the information on its magnetic strip 16' can be read by the magnetic recording head 40 and then erased by its magnetic erasing head 42. These pinch rollers also function, as do the pinch rollers in the time card recorder 10 to propel their recording member out of the transaction recorder 400 along the platen 24' so that magnetic information can be recorded back upon the strip 16' by the magnetic head 40' and so that printed information can be printed upon the front surface of their recording member by a dot matrix printer 54' which is mounted in a printer assembly 62'. The printer assembly 52' is mounted upon support shafts 64' and 66' for movement by a printer indexing assembly 68' in a direction perpendicular to the path of travel of the recording member 408, so that the printer 54' can be caused to print upon selected rows of the recording member 408.

It is envisioned that a device embodying the present invention such as the transaction recorder 400 can be used either as a terminal for a large computer or as a stand alone device containing its own small computer system, as does the time card recorder 10, to perform all of the necessary functions of recording transactions upon its recording member 408.

The above description of the invention is intended to be illustrative and not limiting. Various changes and modifications in the embodiments described may occur to those skilled in the art and these can be made without departing from the spirit or scope of the invention.

We claim:

1. A method for recording both magnetic and printed information on a record card, said method comprising the steps of: moving said card into a housing in a first direction past a stationary transducer adapted for reading and recording magnetic information on said card; moving said card in the opposite direction out of said housing; positioning a printer for printing characters on said card in a line substantially parallel to the direction of motion of said card, so that the movement of said card past said transducer creates a corresponding movement of said card past said printer; and controlling the timing at which both said transducer and said printer record information in correspondence with said movements so that both said magnetic and said printed information are spaced along said member by said movements and said printer records information during motion of said card in said opposite direction.

2. A device for use with a record member capable of recording information visibly and magnetically, said device comprising: magnetic recording means for reading and recording information on said record member; printing means for printing visible information on said record member; mounting means for mounting both said recording and printing means; transport means for moving said member and said mounting means relative to one another, first in said first direction and then in the opposite direction so that, from the frame of reference of said mounting means, said member moves along a predetermined path relative to said mounting means first in said first direction and then in said opposite direction; said information being printed in a line substantially parallel to said first and opposite directions, and timing means for controlling the timing at which both of said recording and said printing means record information on said member in correspondence with said relative movement of said member along said path, so that both said magnetically recorded and said printed information are spaced along said member in the direction of said path by said relative movement and said printed information is printed during movement of said record medium in said opposite direction.

3. A device as in claim 2 wherein said transport means causes said relative movement of said member along said path during said magnetic recording and printing to be continuous.

4. A device as in claim 2 including a housing containing said printing means, said recording means, said transport means and said timing means, said housing having an entrance-exit slot, said transport means being adapted to pull said record member into said housing and expel it from said housing through said slot.

5. A device as in claim 2 wherein said timing means includes sensing means for sensing the extent of said relative movement along said path, and print timing means responsive to said sensing means for controlling the times at which said printing means prints upon said member.

6. A device as in claim 2 wherein said transport means causes said relative movement of said member along said path to occur at a predetermined continuous speed during recording, and wherein said timing means includes an electrical clock signal generator for causing said magnetic recording means to record information upon said member at a clocking rate which has a predetermined relationship with said predetermined speed.

7. A device as in claim 2 wherein said printing means comprises means for printing only one character per actuation, said timing means being adapted to actuate said printing means at each location desired for a character.

8. A device as in claim 2 wherein said magnetic recording means includes erasing means and magnetic reading means for reading magnetic information recorded on said portion of said member which passes said recording means during said relative movement of said member in said first direction before such magnetic information is erased by said erasing means.

9. A device as in claim 8 for recording upon said member the amount of time which has elapsed between a succession of starting times and their corresponding stopping times, said device further including: means for storing a total amount of elapsed time read by said magnetic reading means from said member during said relative movement in said first direction; means for updating said stored total by adding to it the amount of elapsed time between a starting time and a corresponding stopping time; and means for supplying said upated total to said means for recording so that said updated total will be recorded upon said member during said relative movement in said opposite direction.

10. A device as in claim 8 further including: electronic memory means for storing information; means for recording into said memory means information read by said magnetic reading means during the relative movement of said member in said first direction means for reading information from said memory means and supplying it to said magnetic recording means for recording upon said member during said relative movement in said opposite direction; and means for altering the contents of said electronic memory means so as to cause selective portions of the information recorded upon said member during said relative movement in said opposite direction to differ from a corresponding portion of the information read during said relative movement in said first direction.

11. A device as in claim 2 wherein said means for mounting includes means for mounting said printing means for movement in a direction perpendicular to the direction of said path and means for indexing said printing means to move in said perpendicular direction so as to enable said printing means to print upon said member in different paths displaced from each other in a direction perpendicular to said path.

12. A device as in claim 2 in which said record member is an elongated time card for indicating starting and ending times of daily employment for employees, said card having longitudinally-extending rows corresponding to the days of the week, said first and opposite directions being longitudinally of said card, said card having a longiduinally-extending magnetic stripe for storing information.

13. A device as in claim 12 including timing means, and indexing means responsive to said timing means for moving said printing means transversely of said first and opposite directions to align it with another of said rows.

14. A device as in claim 2 in which said record member is selected from the group consisting of a ledger card and a bank passbook with a magnetic stripe extending substantially parallel to the direction of motion of said record member, and location for rows of data, said rows being parallel to said stripe.

15. A time card recording device for use with a time card having a printing surface upon which printed information can be recorded and a strip of magnetic recording material along which magnetic information can be recorded; said device comprising: transport means for moving said card along a predetermined path parallel to the direction of the length of said strip, first in a first direction and then in an opposite direction; magnetic transducer means mounted along said path so as to be in line with said strip as said card moves along said path for reading and recording magnetic information on said strip, erasing means mounted along said path behind said transducer means in said first direction so as to be in line with said strip as said card moves along said path for erasing magnetic information from a portion of the strip that has passed said transducer means during the motion of said card in said first direction; printing means mounted along said path for printing printed information on said card; timing means for controlling the time at which said printing means prints in correspondence with the motion of said card in the opposite direction so that the motion of said card along said path spaces said printed information along a line upon said card which extends in the direction of said motion; indexing means for moving said printer across said path so that said printing means can print on a selected one of a plurality of different lines upon said card, and further timing means for controlling said indexing means to disable said indexing means during printing, and enabling said indexing means at the end of predetermined time period.

16. A method of recording the times of arrival and departure and other information regarding personnel at a place of business, said method comprising the steps of providing an elongated time card having a magnetic stripe extending longitudinally of said card, and a plurality of printed data entry rows for the entry of longitudinally-extending lines of data, there being one such row for each separate time period within a greater time period, inserting said time card into a recording device having a magnetic recording and reproducing transducer and a print head for producing visible printing on said card, moving said card longitudinally past said transducer and said print head, first in one direction, and then in the opposite direction with said transducer adjacent said stripe, and printing data in one of said rows by actuating said print head while holding it stationary in alignment with said one row while said card is moving in the opposite direction.

17. A method as in claim 16 including the step of operating timing means and means responsive to said timing means for moving said print head to align it with another of said rows at the end of each of said separate time periods.

18. A method as in claim 16 in which said stripe contains magnetically-recorded data identifying the employee whose card it is, and other data for that employee, the step of using said transducer to read said data from said stripe as said card moves past said transducer, erasing said data thereafter, and recording new data on said stripe, said printed data indicating the clocking-in and clocking out times for said employee.

19. A method as in claim 18 in which said other data is all of the data needed to calculate said employee's pay for said greater time period.

20. A method as in claim 19 including reading said other data off of said card, delivering it to a computer, causing said computer to calculate the proper information for and to print a paycheck for said employee for said time period.

* * * * *

UNITED STATES PATENT AND TRADEMARK OFFICE
CERTIFICATE OF CORRECTION

PATENT NO. : 4,494,127
DATED : January 15, 1985
INVENTOR(S) : Olin B. King and George Germain It is certified that error appears in the above-identified patent and that said Letters Patent is hereby corrected as shown below:

On the title page;

Face of Patent, after [75], substitute --Inventors: Olin B. King, Huntsville, Ala. and George Germain, Westminster, Mass.-- for "Inventor: Olin B. King, Huntsville, Ala."

After [73], substitute --Assignees: SCI Systems, Inc.,

Column 26, line 3, substitute --said-- for "the" in its second occurrence
Column 26, line 31, substitute --said-- for "the"

Signed and Sealed this

Thirtieth Day of July 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,494,127

DATED : January 15, 1985

INVENTOR(S) : Olin B. King and George Germain

It is certified that error appears in the above-identified patent and that said Letters Patent is hereby corrected as shown below:

Face of Patent, after [75], substitute --Inventors: Olin B. King, Huntsville, Ala. and George Germain, Westminster, Mass.-- for "Inventor: Olin B. King, Huntsville, Ala."

After [73], substitute --Assignees: SCI Systems, Inc., Huntsville, Ala., and Simplex Time Recorder Company, Gardner, Mass.-- for "Assignee: SCI Systems, Inc., Huntsville, Ala."

Column 26, line 3, substitute --said-- for "the" in its second occurrence.
Column 26, line 31, substitute --said-- for "the".

This Certificate supersedes Certificate of Correction issued July 30, 1985.

Signed and Sealed this

Seventeenth Day of December 1985

[SEAL]

Attest:

DONALD J. QUIGG

Attesting Officer

Commissioner of Patents and Trademarks